Patented June 18, 1946

2,402,439

UNITED STATES PATENT OFFICE 2,402,439

REDUCTION OF NITRO COMPOUNDS

John J. Owen, Baton Rouge, La., assignor to Standard Oil Development Company, a corporation of Delaware No Drawing. Application September 22, 1943, Serial No. 503,403

1 Claim. (Cl. 260—580)

This invention relates to the reduction of nitro compounds and deals more particularly with the hydrogenation of nitroaromatic compounds, such as nitrobenzene, nitrotoluene, and nitroxylenes, to the corresponding amines.

It has been previously known that certain aromatic amines, such as aniline and xylidines, form excellent knock suppressors when added to aviation fuel.

One method of preparing such amines is by reduction of the corresponding nitroaromatic compound.

One of the primary objects of the present invention is to provide an improved process for reducing such nitroaromatics to the corresponding amines.

It has been found that a substantial improvement in results may be obtained by reducing the nitro compounds in the presence of a small amount of added water. In some instances, the activity of the catalyst is improved and in other cases the color and quality of the product is also improved by the presence of added water during the reaction.

The hydrogenation of nitroaromatics may be carried out in the presence of a number of different hydrogenating catalysts. The ones commonly employed for this type of service include nickel, copper and the metals of group VI when in the form of metals, oxides, or sulphides. For example, one particularly suitable catalyst for the process comprises molybdenum oxide or sulphide associated with magnesia, alumina, silica gel or other suitable absorptive carriers.

The temperature used for the process normally ranges between 300° and 600° F., depending upon the type of feed, activity of the catalyst, and other factors. The process is preferably carried out under a relatively high pressure such as the order of from 2000 to 3000 pounds per square inch, although in some cases the operation may be carried out under low pressure conditions such as the order of 100 to 500 pounds per square inch.

The amount of hydrogen gas employed may range from 5000 to 15,000 cu. ft./bbl. of fresh feed. In general, it is preferred to employ an excess of hydrogen in order to insure complete reduction of the nitro compounds. The excess hydrogen may also be used to control the reaction temperature.

The reaction results in the liberation of a relatively large amount of heat. In view of this, it is a practice in some cases to dilute the feed with a relatively large amount of liquid cooling medium which serves to absorb the heat generated.

The amount of diluent employed for cooling may be of the order from 200 to 600 volume per cent of the nitroaromatic portion of the feed.

In accordance with the present invention, there is also introduced into the feed a relatively small amount of water. The amount of water used may be of the order of from .3% to 50% of the nitro compounds to be reduced.

The advantages of the present invention will be best shown from the following examples, it being understood that the examples are illustrative rather than limitive.

Example 1

A feed comprising 20 volume per cent of nitroxylenes and 80 volume per cent of xylenes was charged into a vessel containing about 30% of its weight of a catalyst comprising a mixture of magnesium oxide, zinc oxide and molybdenum oxide which had been partially sulfided during its previous use in a destructive hydrogenation process, in which the feed contained a relatively high per cent of sulfur. The vessel was placed under a hydrogen pressure of about 2000 lbs./sq. in. The mixture was heated to a temperature of about 420° F. At this temperature the absorption of hydrogen was evident by the drop in pressure on the vessel. Additional hydrogen was introduced at intervals to maintain a pressure of about 2600 lbs./sq. in. during reaction. The reaction mixture was maintained under the above conditions until no further absorption of hydrogen was evident. The products were then cooled and inspected. The resulting product was considered off-color, being relatively dark.

Example 2

The run was repeated, except that a small amount of water, amounting to about 1.6 volume per cent of the total feed, was added to the vessel and cyclohexane amounting to 80 volume per cent was used as a diluent in the place of the xylenes used in Example 1. The product produced when employing a relatively small amount of water was substantially water-white.

Example 3

A feed comprising 20 volume per cent of nitrobenzene and 80 volume per cent of aniline was passed continuously through a hydrogenation chamber in a mixture of about 1 volume per cent of carbon disulfide and about 12,000 cu. ft. of hydrogen per barrel of feed. The chamber was maintained under total pressure of about 2700 lbs./sq. in. The catalyst within the chamber comprised a mixture of molybdenum sulfide supported on an alumina base. The catalyst had been activated in a hydrogen sulfide atmosphere at a temperature of 875° F. for three hours. The temperature within the reaction was maintained at about 450° F.

Under the above conditions, about 92% of the nitrobenzene was converted to aniline.

*Example 4*

The run set forth in Example 3 was repeated except that 3.5 volume per cent water was mixed with the feed passing through the hydrogenation zone. During this run, about 96% of the nitrobenzene was converted to aniline.

*Example 5*

A run similar to run #3 was made except that the temperature of the hydrogenation reaction was maintained at about 500 and 550° F. At this temperature, about 95% of the nitrobenzene was converted into aniline.

*Example 6*

A run similar to the run described in Example 5 was made, except that a small amount of water amounting to 3.5 volume per cent of total feed was passed through the hydrogenation zone along with the feed. In this run, substantially 100% of the feed was converted into aniline.

*Example 7*

A feed comprising 33 vol. per cent of nitroxylenes, 8.1% water, 0.5% carbon bisulfide, and the balance xylidine was passed through a hydrogenation zone containing a catalyst comprising molybdenum sulfide on charcoal at a total feed rate of 1 volume of liquid feed per volume of catalyst per hour and a hydrogen feed rate of 12,000 cu. ft./bbl. of feed. During a 24 hour period 99% of the nitroxylenes were converted into high quality xylidines. The hydrogenation chamber was maintained at a temperature of 426° F. and under a pressure of about 2100 lbs./sq. in.

The above examples show that a substantial improvement in the quality of product and in the yields may be obtained by mixing a small amount of water during the reduction of the nitro compounds into the corresponding amines.

I claim:

An improved process for producing aromatic amines by the reduction of aromatic nitro compounds which comprises passing a liquid mixture of the nitroaromatic and a non-reactive solvent therefor continuously through a reducing zone maintained at 300 to 600° F., and containing a catalyst comprising mixed sulfides of molybdenum, magnesium and zinc, continuously supplying hydrogen in excess of the amount required for reduction and water less than 25% by volume of the nitroaromatic compounds, and maintaining the mixture of solvent and nitroaromatic compound in liquid phase by pressure imposed of the order of 2,000 to 3,000 pounds per square inch.

JOHN J. OWEN.